(12) United States Patent
Yamada et al.

(10) Patent No.: US 9,714,606 B2
(45) Date of Patent: Jul. 25, 2017

(54) VEHICLE POWER GENERATING APPARATUS

(71) Applicant: MAZDA MOTOR CORPORATION, Hiroshima (JP)

(72) Inventors: Masanao Yamada, Hiroshima (JP); Tatsuo Ito, Hiroshima (JP); Yoshinori Ogata, Hiroshima (JP); Hirotaka Tamari, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 339 days.

(21) Appl. No.: 14/525,775

(22) Filed: Oct. 28, 2014

(65) Prior Publication Data
US 2015/0252721 A1 Sep. 10, 2015

(30) Foreign Application Priority Data

Mar. 4, 2014 (JP) .................................. 2014-041515

(51) Int. Cl.
*F02B 53/14* (2006.01)
*F02B 63/04* (2006.01)
(Continued)

(52) U.S. Cl.
CPC ................ *F02B 53/14* (2013.01); *B60K 6/42* (2013.01); *B60K 13/04* (2013.01);
(Continued)

(58) Field of Classification Search
CPC ........ F02B 53/14; F02B 63/04; F02B 63/044; F02B 63/047; F02B 63/048; F02B 75/007;
(Continued)

(56) References Cited

U.S. PATENT DOCUMENTS 8,004,099 B2 * 8/2011 Yuri ........................ F02D 29/06
123/305
8,356,472 B2 * 1/2013 Hiranuma ........... F01N 13/0097
180/309
(Continued)

FOREIGN PATENT DOCUMENTS

JP S54-084112 A 7/1979
JP S55-25611 U 2/1980
(Continued)

OTHER PUBLICATIONS

An Office Action; "Notification of Reasons for Refusal," issued by the Japanese Patent Office on Dec. 20, 2016, which corresponds to Japanese Patent Application No. 2014-041515 and is related to U.S. Appl. No. 14/525,775; with English language translation.

*Primary Examiner* — Grant Moubry
(74) *Attorney, Agent, or Firm* — Studebaker & Brackett PC (57) ABSTRACT

Disclosed is a vehicle power generating apparatus which comprises: a generator; a rotary engine configured to serve as an engine for driving the generator, and installed in the vehicle in a posture where an output shaft thereof extends in an up-down direction; and an intake pipe and an exhaust pipe each connected to the rotary engine. The rotary engine comprises a pair of upper and lower side housings, and a rotor housing located between the upper and lower side housings. the rotor housing and the lower side housing are formed with an intake port and an exhaust port, respectively. The intake pipe is connected to a side surface of the rotor housing in such a manner as to be communicated with the intake port, and the exhaust pipe is connected to the lower side housing in such a manner as to be communicated with the exhaust port.

8 Claims, 9 Drawing Sheets

(FRONT) ← → (REAR)
VEHICLE FRONT-
REAR DIRECTION (51) Int. Cl.
*B60K 6/42* (2007.10)
*B60K 13/04* (2006.01)
*B60K 5/00* (2006.01)

(52) U.S. Cl.
CPC ..... *B60K 2005/006* (2013.01); *B60Y 2200/92* (2013.01); *F02B 63/04* (2013.01); *Y02T 10/17* (2013.01)

(58) Field of Classification Search
CPC .......... B60K 13/02; B60K 13/04; B60K 6/42; B60K 5/00; B60K 5/04; B60K 5/06; B60Y 2200/90; B60Y 2200/92; B60Y 2200/91; B60L 11/02; Y02T 10/17
USPC .............. 123/200, 195 HC; 180/65.1, 65.21, 180/65.285, 65.31
See application file for complete search history.

(56) References Cited

U.S. PATENT DOCUMENTS

| | | | |
|---|---|---|---|
| 8,403,096 B2* | 3/2013 | Taguchi | B60K 1/04 180/291 |
| 9,162,578 B2* | 10/2015 | Venturi | B60K 6/383 |
| 9,242,544 B2* | 1/2016 | Kochidomari | B60K 7/0007 |
| 2011/0073390 A1 | 3/2011 | Taguchi et al. | |
| 2011/0168468 A1* | 7/2011 | Taguchi | B60K 1/02 180/65.245 |

FOREIGN PATENT DOCUMENTS

| | | |
|---|---|---|
| JP | H06-058163 A | 3/1994 |
| JP | 2011-073580 A | 4/2011 |

\* cited by examiner

VEHICLE POWER GENERATING APPARATUS

BACKGROUND OF THE INVENTION

1. Field of the Invention

The present invention relates to a vehicle power generating apparatus designed to be installed in a hybrid vehicle or the like.

2. Background Art

As an example of a power generating apparatus for a series hybrid vehicle, JP 2011-73580 A (hereinafter referred to as "the Patent Literature") discloses a type in which a generator, an engine (internal combustion engine) for driving the generator, and a fuel tank, are provided beneath a rear floor panel of a vehicle. The engine is a two-cylinder small-size reciprocating engine, and is disposed just below a rear seat. The generator is disposed rearward of the engine, and the fuel tank is disposed on a lateral side of the engine.

The Patent Literature mentions that the engine may be a single-rotor rotary engine. In this regard, the Patent Literature also mentions that the rotary engine is disposed in a posture where an eccentric shaft (output shaft) thereof extends in an up-down direction, whereby an up-down directional length of the engine can be shortened and thus a lowering in height position of the rear floor panel can be facilitated, as compared to the case of using a reciprocating engine.

However, in the Patent Literature, only the point of disposing the rotary engine in such a manner as to allow the eccentric shaft (output shaft) to extend in the up-down direction is disclosed as one measure to reduce an up-down directional occupied space of the power generating apparatus, but any other measure is not disclosed.

Moreover, in the power generating apparatus disclosed in the Patent Literature, the engine is disposed beneath the rear floor panel as mentioned above. This raises a need to avoid deterioration in ride comfort due to exhaust noise of the engine. Thus, it is also necessary to take into account this point when carrying out the above measure to reduce the occupied space of the power generating apparatus.

SUMMARY OF THE INVENTION

In a vehicle power generating apparatus comprising a rotary engine, it is an object of the present invention to provide a technique capable of reducing an up-down directional occupied space of the power generating apparatus, while suppressing exhaust noise of the engine.

In order to achieve the above object, the present invention provides a vehicle power generating apparatus disposed in a position beneath a floor panel of a vehicle. The vehicle power generating apparatus comprises: a generator; a rotary engine configured to serve as an engine for driving the generator, and installed in the vehicle in a posture where an output shaft thereof extends in an up-down direction; and an intake pipe and an exhaust pipe each connected to the rotary engine, wherein the rotary engine comprises a pair of upper and lower side housings, and a rotor housing located between the upper and lower side housings, wherein the rotor housing and the lower side housing are formed with an intake port and an exhaust port, respectively, and wherein the intake pipe is connected to a side surface of the rotor housing in such a manner as to be communicated with the intake port, and the exhaust pipe is connected to the lower side housing in such a manner as to be communicated with the exhaust port.

DETAILED DESCRIPTION OF THE PREFERRED EMBODIMENTS OF THE INVENTION

With reference to the accompanying drawings, the present invention will now be described in detail, based on one preferred embodiment thereof. As used in this specification, the terms "front (forward)", "rear (rearward)", "right (rightward)" and "left (leftward)" are based on vehicle front-rear and right-left (width) directions (direction indicators illustrated in the figures).

<Schematic Configuration of Vehicle>

Figure 1:
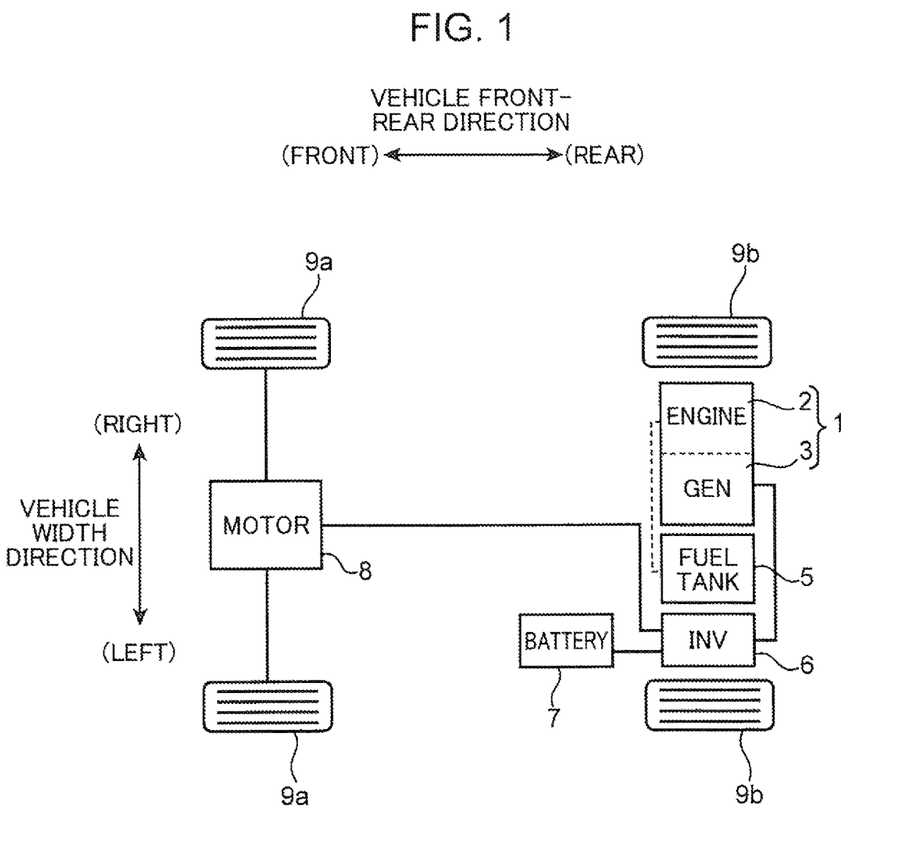
FIG. 1 is a diagram illustrating a schematic configuration of a vehicle employing a vehicle power generating apparatus according to one embodiment of the present invention.

FIG. 1 illustrates a schematic configuration of a vehicle employing a vehicle power generating apparatus according to one embodiment of the present invention. This vehicle is a five-seater hatchback-type (see FIG. 2) hybrid vehicle, more specifically, a series hybrid vehicle.

As illustrated in FIG. 1, the vehicle is equipped with: a power generation unit 1 comprising a generator 3 and an engine 2 for driving the generator 3; an inverter 6; a high-capacity battery 7, such as a lithium-ion battery, capable of being charged with electricity generated by the generator 3, via the inverter 6; a motor 8 for rotationally driving driven wheels (right and left front wheels 9a) by electricity supplied from the battery 7 via the inverter 6; and a fuel tank 5 for containing fuel to be supplied to the engine 2. That is, the vehicle is configured such that, during short-distance travel, etc., the motor 8 is driven for vehicle traveling, by using electricity preliminarily stored in the battery 7, and, during vehicle deceleration, etc., the battery 7 is charged with regenerative electric power generated by the motor. The vehicle is further configured such that, when a remaining capacity of the battery 7 is reduced to a given value or less during long-distance travel, the generator 3 is driven by the engine 2, and resulting generated electricity is supplied to the battery 7 to charge the battery 7. Although illustration is omitted, the vehicle may be equipped with a charging plug capable of electrically charging the battery 7 therethrough by using a standard charger as a domestic power supply, a quick charger placed in a parking area or the like, etc.

<Overall Structure of Vehicle>

Figure 2:
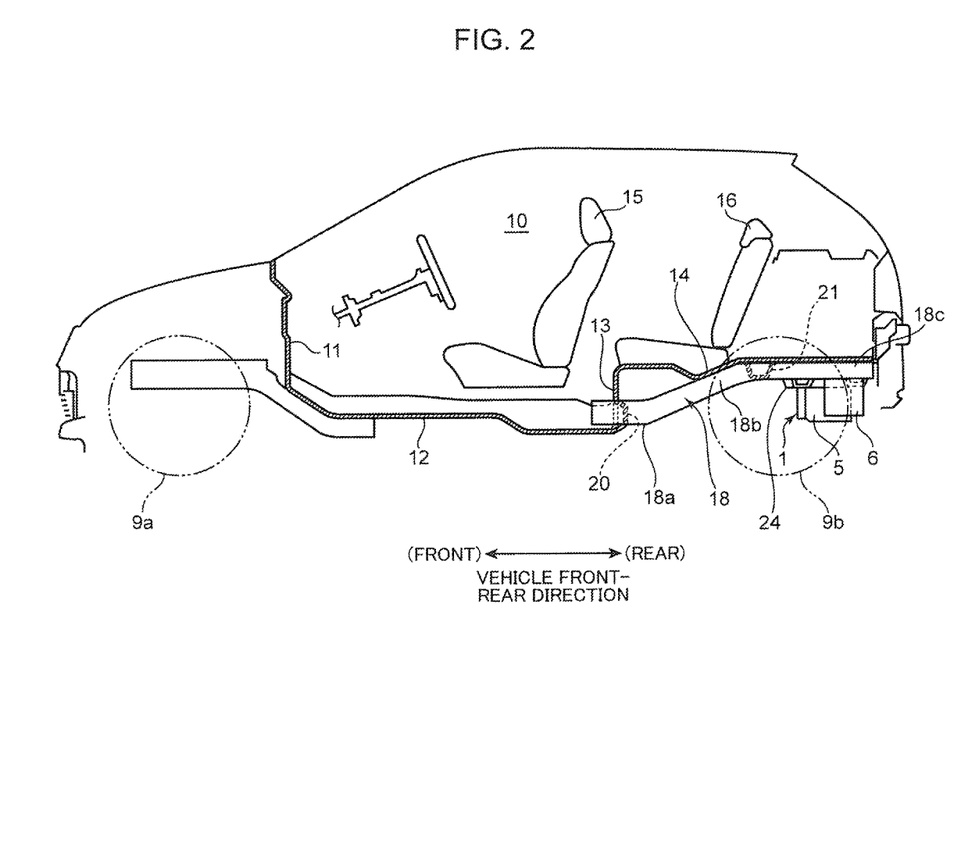
FIG. 2 is a schematic side view illustrating an overall structure of the vehicle.

As illustrated in FIG. 2, the vehicle has: a dash panel 11 disposed at a front of a passenger compartment 10; a front floor panel 12 disposed to extend in a vehicle rear direction (rearwardly) from a lower edge of the dash panel 11; a kick-up portion 13 disposed to extend upwardly from a rear edge of the front floor panel 12; and a rear floor panel 14 disposed to extend rearwardly from a top edge of the kick-up portion 13. A front row seat 15 consisting of a driver seat and a front passenger seat is mounted on the front floor panel 12, and a rear row seat 16 is mounted on a portion of the rear floor panel 14 located just rearward of the front row seat 15.

A pair of right and left rear side frames 18 are disposed rearward of the kick-up portion 13 to extend in a vehicle front-rear direction along a lower surface of the rear floor panel 14. Specifically, each of the right and left rear side frames 18 has: a front horizontal portion 18a extending horizontally rearwardly (horizontally in the vehicle rear direction) from the kick-up portion 13; an inclined portion 18b extending rearwardly and obliquely upwardly from a rear end of the front horizontal portion 18a located just below the rear row seat 16; and a rear horizontal portion 18c extending horizontally rearwardly from a rear end of the inclined portion 18b located just rearward of the rear row seat 16. A front cross member 20 extending in a vehicle width direction while being joined to a back surface of the kick-up portion 13, and a rear cross member 21 extending in the vehicle width direction at a position beneath the rear floor panel 14 and rearward of the rear row seat 16, are disposed between the right and left rear side frames 18.

On a rear side of the rear cross member 21, a unit frame 24 is disposed to extend across the right and left rear side frames 18 in the vehicle width direction, and fixed to the rear side frames 18. The power generation unit 1, the fuel tank 5 and the inverter 6 are assembled to the unit frame 24. In this embodiment, a combination of the power generation unit 1 (the engine 2 and the generator 3), the fuel tank 5 and aftermentioned intake and exhaust systems of the engine 2 is equivalent to "vehicle power generating apparatus" set forth in the appended claims.

Figure 3:
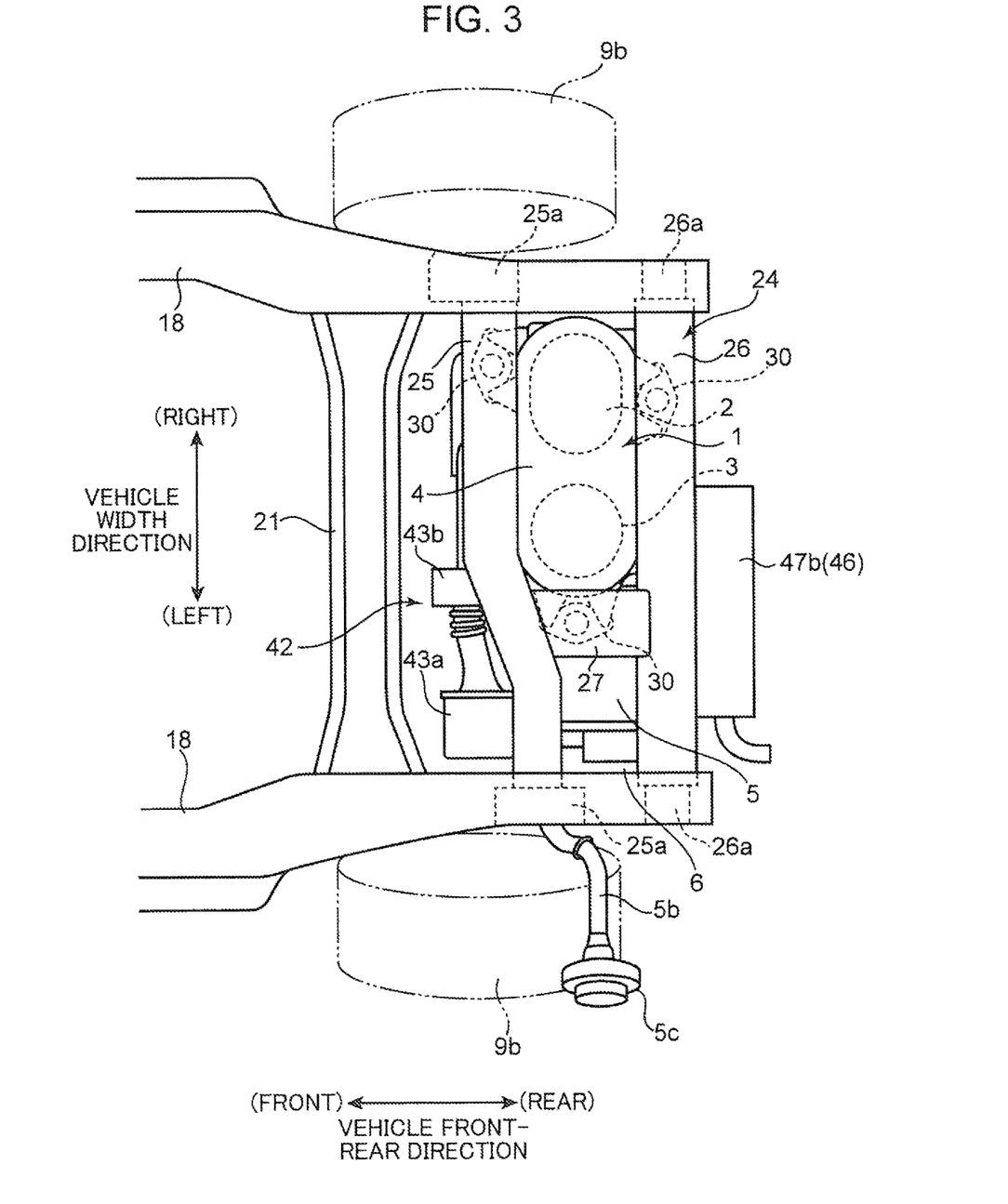
FIG. 3 is a schematic top plan view illustrating a rear structure of the vehicle (wherein a cross member is illustrated).
Figure 6:
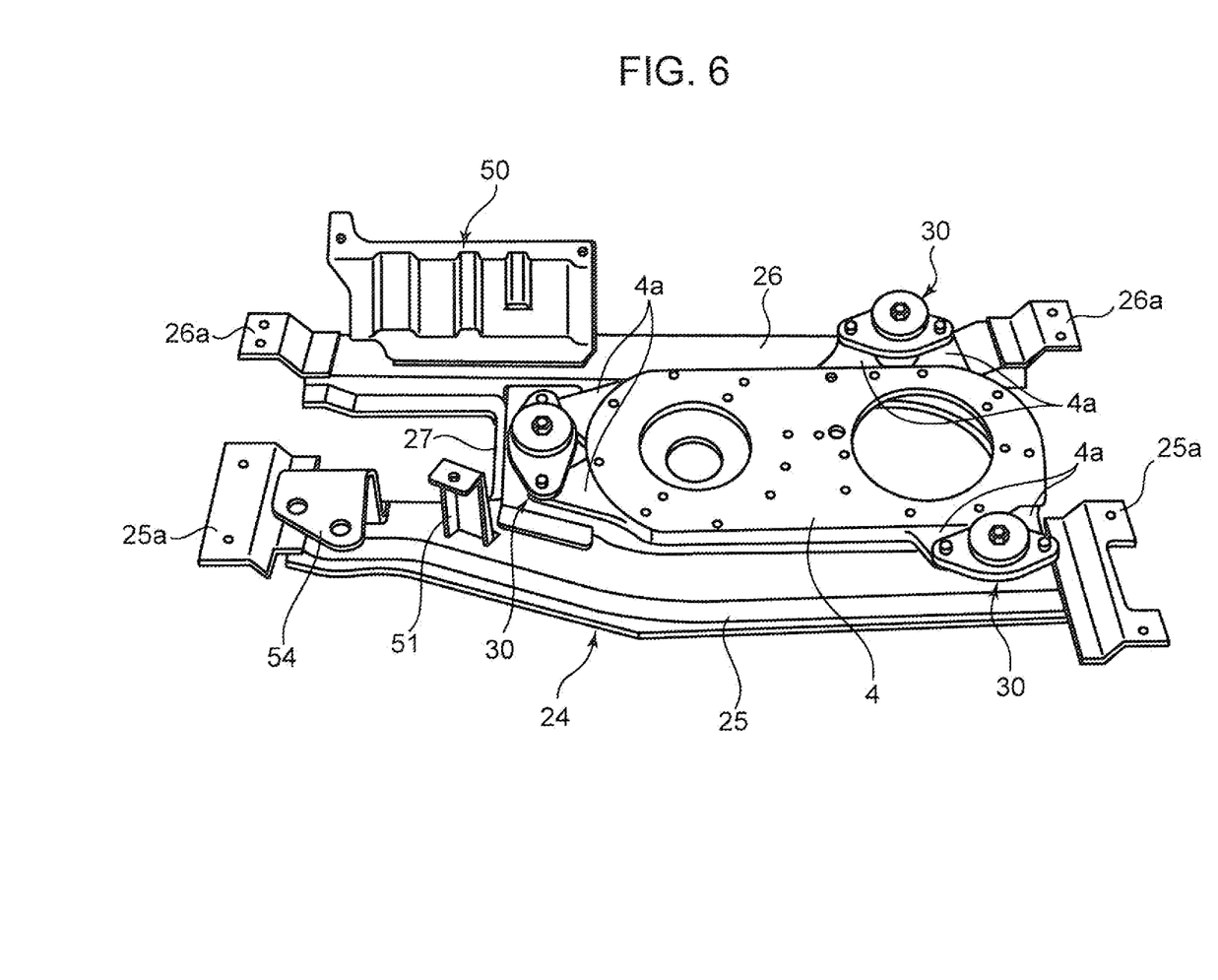
FIG. 6 is a perspective view illustrating a frame member.

FIG. 3 illustrates, in the form of a top plan view, a rear structure of the vehicle, specifically, a rear structure of the vehicle in a state in which the rear floor panel 14 is removed therefrom. Further, FIG. 6 illustrates, in the form of a perspective view, the unit frame 24 (in an upside-down state with respect to FIG. 3). As illustrated in FIGS. 3 and 6, the unit frame 24 is formed in a generally H shape in top plan view. That is the unit frame 24 comprises: a first sub-cross member 25 extending in the vehicle width direction at a position between right and left rear wheels 9b; a second sub-cross member 26 extending in the vehicle width direction at a position rearward of the rear wheels 9b; and a coupling frame 27 disposed to extend in the front-rear direction at a position offset slightly leftwardly from a center in the vehicle width direction and joined (welded) to the first and second sub-cross members 25, 26 to thereby couple the first and second sub-cross members 25, 26 together. Each of the sub-cross members 25, 26 and the coupling frame 27 has a closed cross-section structure (see FIG. 7).

Each of the sub-cross members 25, 26 has two attaching flanges 25a (26a), respectively, at longitudinal opposite ends (vehicle width directional opposite ends) thereof. Each of the flanges 25a (26a) is fastened to a respective one of the rear side frames 18 by means of a non-illustrated weld bolt provided in the rear side frame 18 and a non-illustrated nut. In this way, the unit frame 24 is fixed to the rear side frames 18 at a position on a lower side thereof. Then, the power generation unit 1, the fuel tank 5, the inverter 6 and others are assembled to the unit frame 24 at a position on a lower side thereof.

Figure 4:
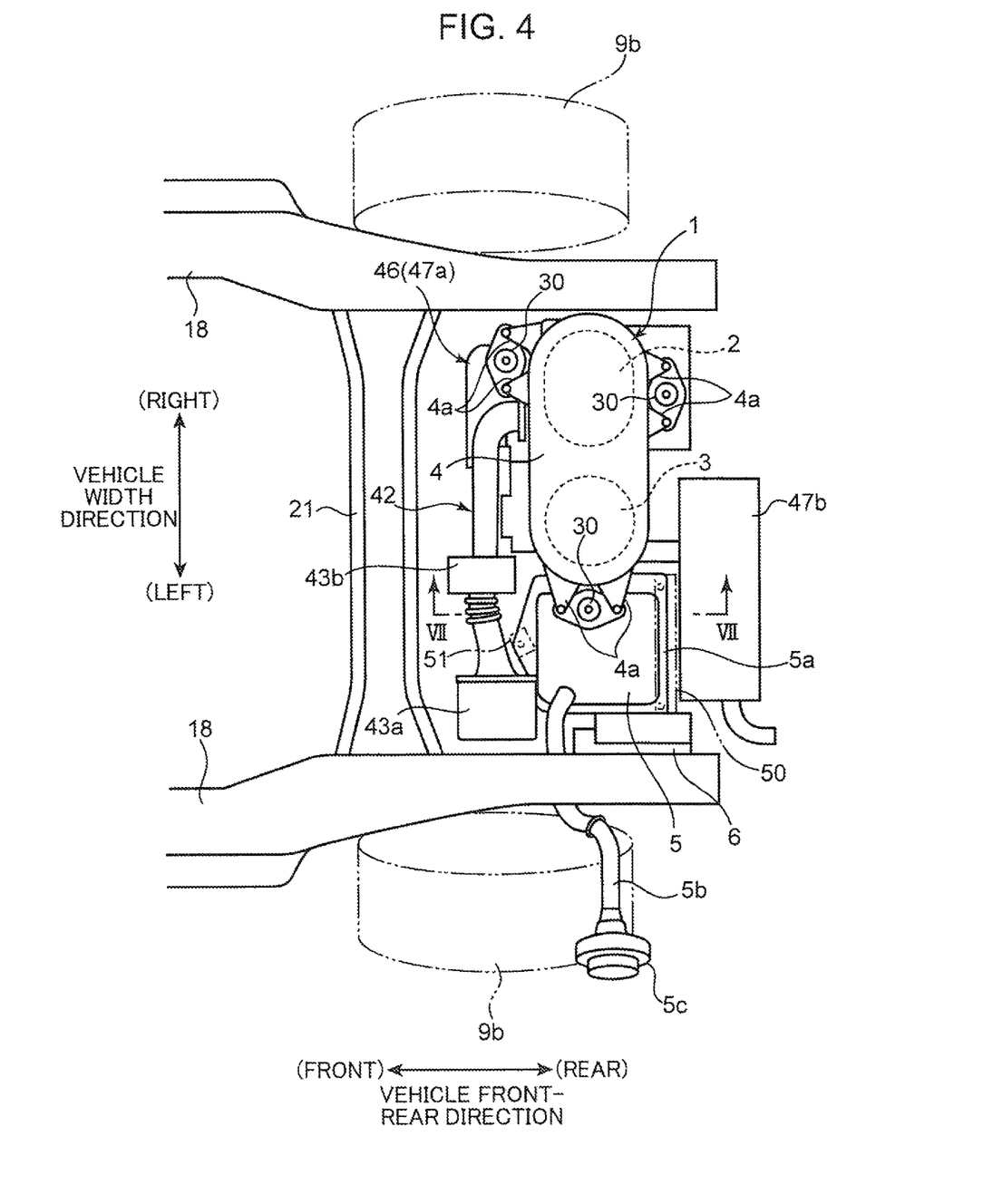
FIG. 4 is a schematic top plan view illustrating the rear structure of the vehicle (wherein the cross member is omitted).

FIG. 4 illustrates, in the form of a top plan view, the rear structure of the vehicle in a state in which the unit frame 24 is omitted. As illustrated in FIG. 4, the power generation unit 1 comprises the engine 2, the generator 3, and a frame member 4 to which the engine 2 and the generator 3 are assembled in a laterally side-by-side arrangement.

The engine 2 is a single rotor small-size rotary engine. The engine 2 is connected with an aftermentioned intake pipe 42 and an aftermentioned exhaust pipe 46.

Figure 8:
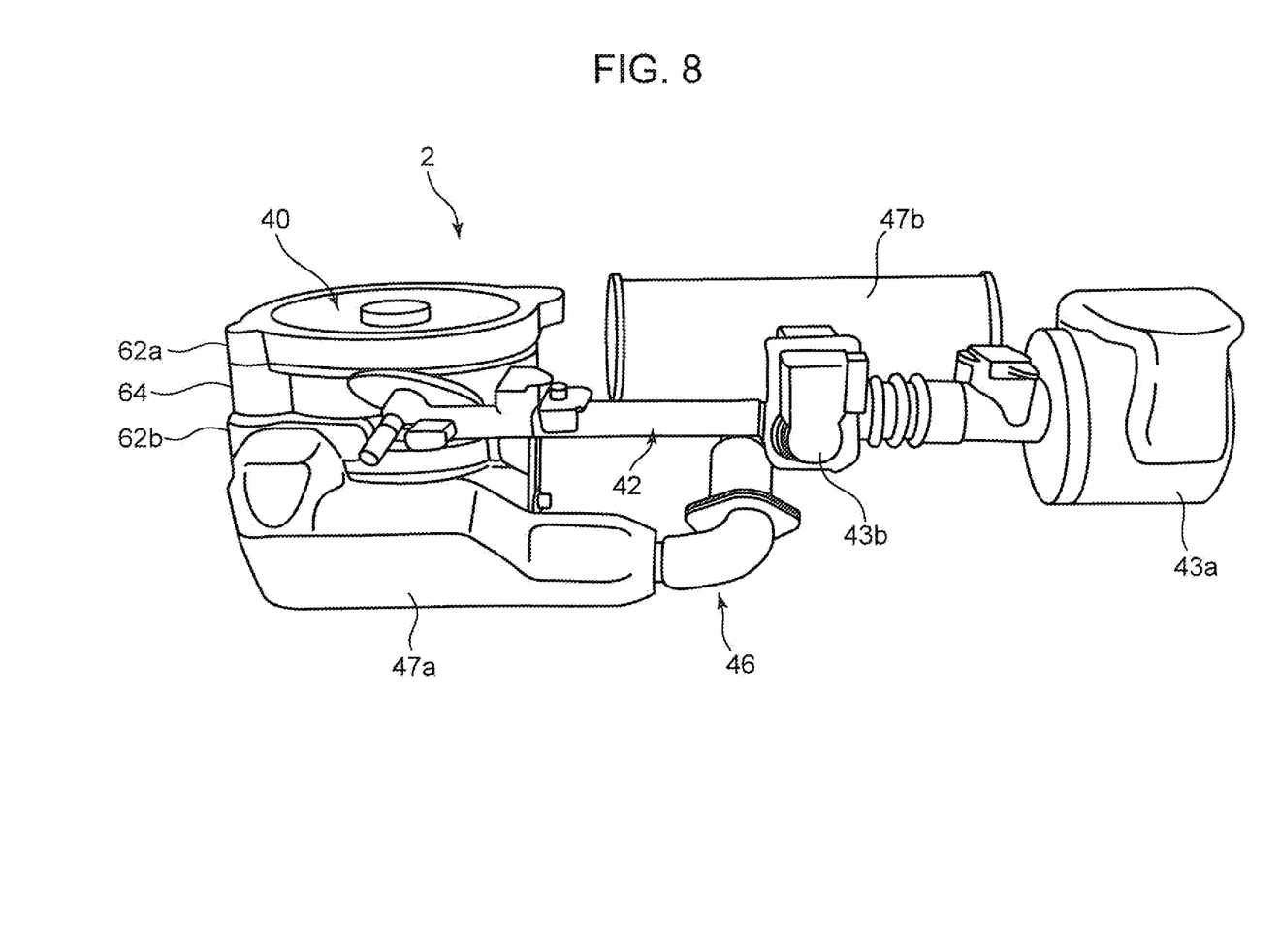
FIG. 8 is a perspective view illustrating an engine and its intake and exhaust systems.
Figure 9:
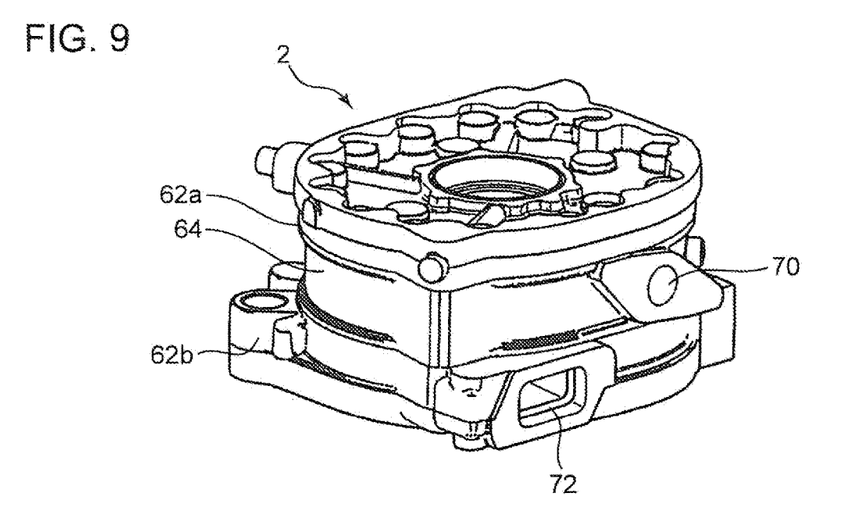
FIG. 9 is a perspective view illustrating the engine.
Figure 10:
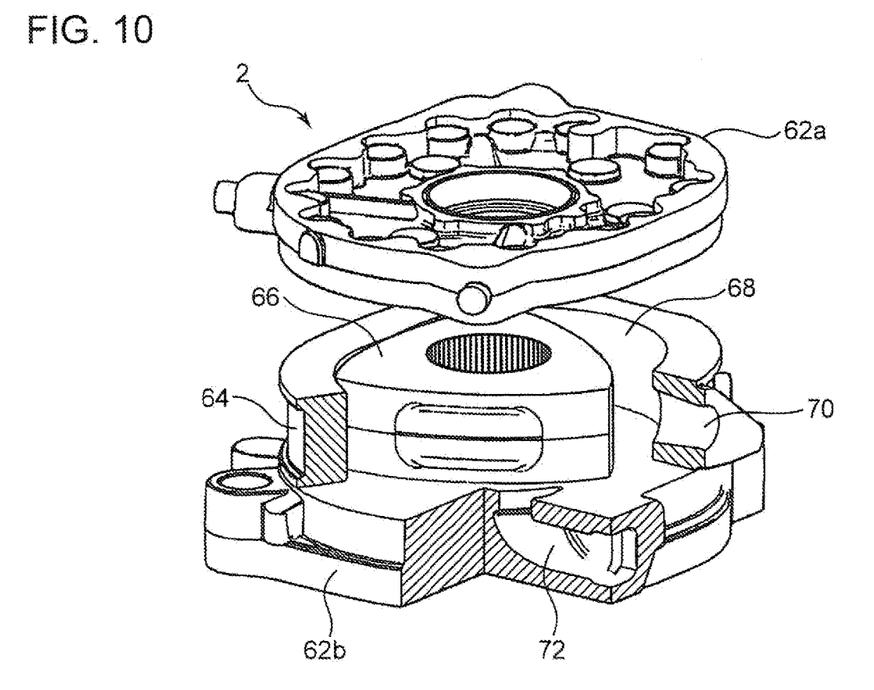
FIG. 10 is a partially cut-away perspective view illustrating the engine.

As illustrated in FIGS. 8 to 10, the engine 2 comprises: a pair of upper and lower side housings 62a, 62b; a rotor housing 64 (center housing) interposed between the upper and lower side housings 62a, 62b; a rotor 66 received in an up-down directionally flat rotor receiving chamber 68 defined by the housings 62a, 62b, 64; and a non-illustrated eccentric shaft extending in an up-down direction. The engine 2 is configured such that a torque of the rotor 66 generated by carrying out intake, compression, combustion (expansion) and exhaust strokes in three working chambers defined between the rotor 66 and a trochoidal inner peripheral surface of the rotor receiving chamber 68 is extracted from the eccentric shaft serving as an output shaft.

In this embodiment, the engine 2 is disposed in a horizontal posture where the eccentric shaft extends in the up-down direction. The reason is as follows. In the case where a rotary engine is used as a vehicle-driving engine, the engine is mounted on a vehicle in a vertical posture where an eccentric shaft thereof extends horizontally (hereinafter referred to as "vertically mounted state", for the sake of explanation), because it is necessary to transmit a driving force to driven wheels via a transmission and others. However, the above engine 2 is a generator-driving engine for driving the generator 3, so that the engine 2 is not necessarily installed in the vertically mounted state. The engine 2 is a single-rotor small-size rotary engine as mentioned above, wherein it has a flat structure in an axial direction of the eccentric shaft. Thus, in order to lower a height position of the rear floor panel 14 while effectively utilizing a space beneath the rear floor panel 14, the engine 2 is installed in the vehicle in a horizontal posture where the eccentric shaft extends vertically (hereinafter referred to as "horizontally mounted state", for the sake of explanation).

The engine 2 is fixed to the frame member 4 via the upper side housing 62a. As illustrated in FIGS. 4 and 6, the frame member 4 is a plate-like member made of metal and formed in an elongated shape in the vehicle width direction. The engine 2 is fixed to the frame member 4 at a position close to one end in a longitudinal direction thereof (in FIG. 4, a position close to an upper end thereof). Specifically, the engine 2 is fixed to the frame member 4 by fixing the upper side housing 62a of the engine 2 to a lower surface of the frame member 4, using a bolt and nut set.

Further, the generator 3 is fixed to the frame member 4 along the longitudinal direction of the frame member 4 and in adjacent relation to the engine 2. Specifically, the generator 3 is fixed to the frame member 4 by fixing a flange formed in a casing of the generator 3, to the lower surface of the frame member 4, using a set of bolt and nut.

An output shaft of the generator 3 and the eccentric shaft of the engine 2 are coupled together via a non-illustrated sprocket and chain set or the like at a position beneath the generator 3 and the engine 2. Through this coupling, the generator 3 can be driven by the engine.

Although illustration is omitted, the casing of the generator 3, and the rotor housing 64 and the lower side housing 62b of the engine 2 are appropriately coupled together via a non-illustrated coupling stay. In this way, the power generation unit 1 is constructed as a high-rigidity unit in which the engine 2 and the generator 3 are strongly united.

As illustrated in FIGS. 3, 4, 6 and 7, the power generation unit 1 is assembled to the unit frame 24 through a plurality of (in this embodiment, three) mounts 30, in a posture where the generator 3 is located in a central region of the vehicle in the vehicle width direction, and the engine 2 is located on a right side of the vehicle. Specifically, three pairs of flanges 4a are integrally formed in an outer periphery of the frame member 4, more specifically, integrally formed, respectively, in two regions of the outer periphery forward and rearward of the engine 2 assembled to the frame member 4 and a region of the outer periphery leftward of the generator 3 assembled to the frame member 4, and each of the mounts 30 is fixed to a respective one of the pairs of flanges 4a by two bolts B2. Further, each of the first and second sub-cross members 25, 26 and the coupling frame 27 is provided with a set of a weld bolt B1. Thus, the power generation unit 1 is assembled to the unit frame 24 by fastening each of the mounts 30 to a respective one of the first and second sub-cross members 25, 26 and the coupling frame 27 of the unit frame 24 by the set of a weld bolt B1 and a nut N1. Specifically, among the pairs of flanges 4a of the frame member 4, the flange 4a located forward of the engine 2, the flange 4a located rearward of the engine 2 and the flange 4a located leftward of the generator 3 are assembled, respectively, to the first sub-cross member 25, the second sub-cross member 26 and the coupling frame 27, through the mounts 30. In this way, the power generation unit 1 is assembled to the unit frame 24 from therebelow, and supported by the unit frame 24.

Figure 7:
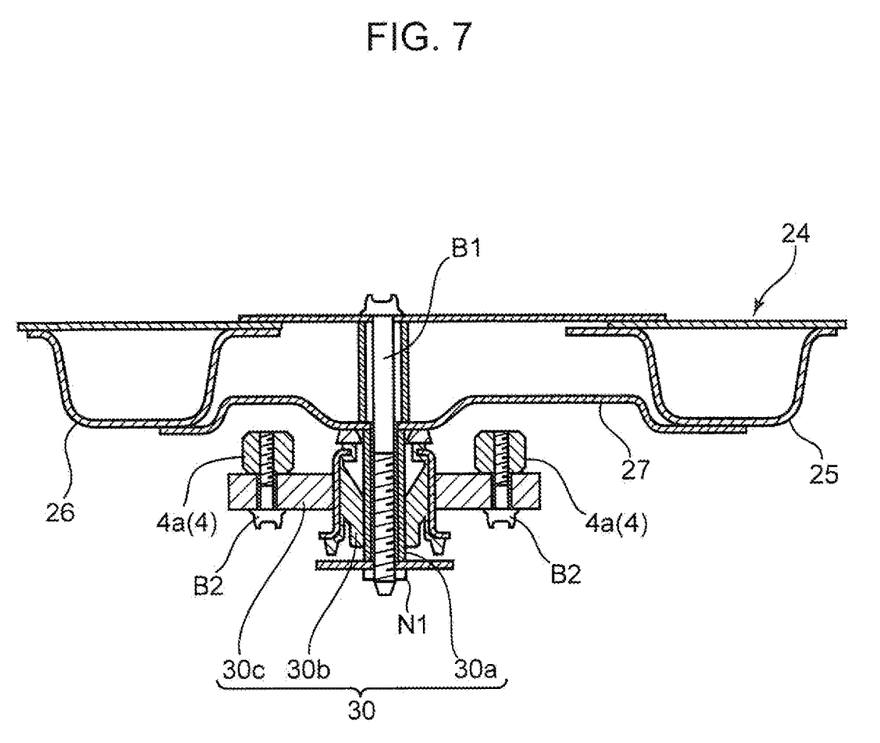
FIG. 7 is a sectional view illustrating a structure for assembling a power generation unit to a unit frame (a sectional view taken along the line VII-VII in FIG. 4).

Each of the mounts 30 has the same structure. Specifically, as illustrated in FIG. 7, each of the mounts 30 comprises: a tubular-shaped fastenable member 30a to be fastened to the unit frame 24; a cylindrical-shaped elastic member 30b fixed on an outer peripheral surface of the fastenable member 30a; and a unit fixing member 30c fitted on the elastic member 30b and configured to allow the power generation unit 1 (frame member 4) to be fixed thereto. Thus, the unit fixing member 30c can be moderately elastically displaced with respect to the fastenable member 30a. That is, when the power generation unit 1 is assembled to the unit frame 24 through the mounts 30, it becomes possible to suppress a situation where vibration of the power generation unit 1 caused by operations of the engine 2 and the generator 3 is transmitted to an inside of the passenger compartment via the unit frame 24 and others.

Figure 5:
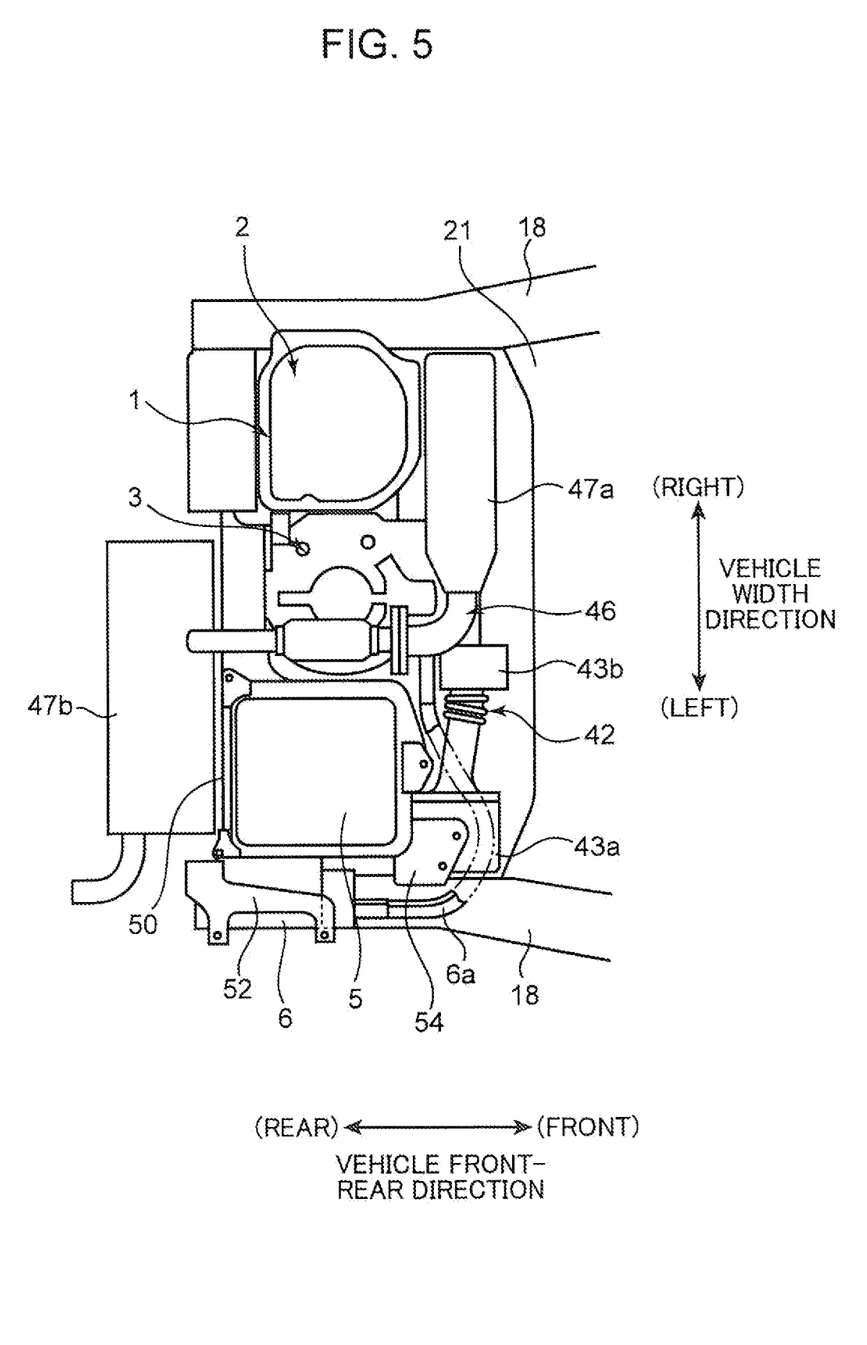
FIG. 5 is a schematic bottom view illustrating the rear structure of the vehicle.

As illustrated in FIGS. 9 and 10, in the engine 2, the rotor housing 64 is formed with an intake port 70, and the lower housing 62b is formed with an exhaust port 72. That is, the engine 2 has a so-called peripheral-intake and side-exhaust engine structure in which the intake port 70 is formed as a peripheral port, and the exhaust port 72 is formed as a side port. The intake port 70 is opened in a front region of a side surface of the rotor housing 64. The exhaust port 72 is opened in a front region of a side surface of the lower side housing 62b at a position rightward of the intake port 70. Thus, as illustrated in FIGS. 4, 5 and 8, an intake pipe 42 is connected to the front region of the side surface of the rotor housing 64 of the engine 2, and an exhaust pipe 46 is connected to the front region of the side surface of the lower side housing 62b.

The intake pipe 42 is disposed to extend in the vehicle width direction along the first sub-cross member 25 of the unit frame 24, at a position forward of the generator 3. The intake pipe 42 is provided with an air cleaner 43a at an air intake end thereof, and a throttle body 43b at a given position between the air cleaner 43a and the engine 2. The air cleaner 43a is fixed to a bracket 54 (see FIGS. 5 and 6) joined to a lower surface of the first sub-cross member 25 of the unit frame 24, and the throttle body 43b is fixed to the first sub-cross member 25 at a given position.

The exhaust pipe 46 is disposed below the intake pipe 42. As illustrated in FIGS. 5 and 8, the exhaust pipe 46 comprises: an exhaust gas purifying device 47a composed, for example, of a three-way catalyst, and disposed forward of the engine 2 to extend in the vehicle width direction along the intake pipe 42, up to a position approximately forward of the generator 3; and a muffler (silencer) 47b disposed rearward of the fuel tank described in detail later, and suppress exhaust noise of the engine 2. The exhaust pipe 46 is formed to guide exhaust gas discharged from the engine 2 and purified by the exhaust gas purifying device 47a, into the muffler 47b via a position beneath the generator 3. Each of the exhaust gas purifying device 47a and the muffler 47b is supported by a respective one of the first sub-cross member 25 and the second sub-cross member 26, through a non-illustrated rubber hanger and bracket, or the like.

Then, the fuel tank 5 and the inverter 6 are arranged from the side of the power generation unit 1 in this order, laterally side-by-side with respect to the power generation unit 1, i.e., arranged in such a manner as to be approximately aligned with the engine 2 and the generator 3 in the vehicle width direction. Each of the fuel tank 5 and the inverter 6 is fixed to a lower surface of the unit frame 24.

As illustrated in FIGS. 4 and 5, the fuel tank 5 has an approximately cubic shape. The fuel tank 5 is fixed to the unit frame 24 through a rear bracket 50 and a front bracket, 51 (see FIG. 6) joined, respectively, to the lower surface of the first sub-cross member 25 and a lower surface of the second sub-cross member 26. Specifically, the fuel tank 5 has a flange 5a formed on a side surface thereof at an intermediate position in the up-down direction to extend approximately over the entire periphery thereof. Then, the fuel tank 5 is inserted between the rear and front brackets 50, 51, and the flange 5a is superimposed on respective distal ends (lower ends) of the brackets 50, 51. In this state, the flange 5a is fastened to the brackets 50, 51 by bolt and nut sets. In this way, the fuel tank 5 is fixed to the unit frame 24 through the rear and front brackets 50, 51.

A fuel filler pipe 5b is connected to a left corner of a front region of an upper surface of the fuel tank 5. A base end of the fuel filler pipe 5b is connected to a fuel filler unit 5c fixed to the vehicle body. That is, the fueling to the fuel tank 5 is enabled by a non-illustrated filler cap of the fuel filler unit 5c being removed.

In the brackets 50, 51 to which the fuel tank 5 is fixed, the rear bracket 50 is a wide plate-like member disposed to extend in the vehicle width direction along the second sub-cross member 26, as illustrated in FIGS. 5 and 6. This bracket 50 is interposed between the fuel tank 5 and the muffler 47b to shield them provide shielding therebetween, thereby shielding the fuel tank 5 from heat of the muffler 47b. That is, the bracket 50 additionally serves as a heat shield member for blocking radiant heat from the muffler 47b.

The inverter 6 is formed to have an approximately rectangular parallelepiped shape, and disposed leftward of the fuel tank 5. A bracket 52 is fixed to the second sub-cross member 26 and the bracket 50, and the inverter 6 is supported by the bracket 52 from therebelow, in such a manner as to extend across the second sub-cross member 26 and the bracket 50 (see FIG. 5). The inverter 6 is fixed to a non-illustrated mounting portion provided in the left rear side frame 18. The sign 6a in FIG. 5 denotes a power transmission cable connecting between the inverter 6 and the generator 3.

<Functions and Advantageous Effects of Vehicle Power Generating Apparatus>

In the above embodiment, a combination of the power generation unit 1, the fuel tank 5 and the intake and exhaust systems of the engine 2 is equivalent to "vehicle power generating apparatus" set forth in the appended claims, as mentioned above. In the vehicle power generating apparatus according to the above embodiment, as the engine 2, the single-rotor small-size rotary engine is employed and installed in the vehicle in a horizontally mounted state where the eccentric shaft thereof extends in the up-down direction, i.e., in an up-down directionally flat state, as described above. Further, as an intake-exhaust port structure of the engine 2, a peripheral intake port and a side exhaust port are employed, and the intake pipe 42 and the exhaust pipe 46 are connected, respectively, to the side surface of the rotor housing 64 and the side surface of the lower side housing 62b. Then, each of the intake pipe 42 and the exhaust pipe 46 is routed along an approximately horizontal plane. Thus, in the vehicle power generating apparatus according to the above embodiment, the engine 2, the intake pipe 42 and the exhaust pipe 46 are intensively arranged in the up-down direction, so that an up-down directional occupied space of the vehicle power generating apparatus is effectively reduced. In addition, the exhaust port 72 is formed in the lower side housing 62b, so that exhaust noise is suppressed. That is, the rotor housing 64 and the upper side housing 62a are interposed between the lower side housing 62b formed with the exhaust port 72 and the rear floor panel 14, so that exhaust noise occurring in the exhaust port 72 is blocked by the rotor housing 64 and the upper side housing 62a to ease an influence of the exhaust noise on the passenger compartment 10.

Therefore, the vehicle power generating apparatus according to the above embodiment can reduce an up-down directional occupied space thereof, while suppressing exhaust noise of the engine 2. In addition, as a result of reducing the up-down directional occupied space of the vehicle power generating apparatus, it becomes possible to lower the height position of the rear floor panel 14 to ensure a larger space of the passenger compartment 10.

In the vehicle power generating apparatus according to the above embodiment, the engine 2 and the generator 3 are arranged in adjacent relation to each other in the vehicle width direction, and the intake pipe 42 is connected to the front region of the side surface of the rotor housing 64 of the engine 2 and disposed to extend in the vehicle width direction, across a position forward of the generator 3. Thus, the engine 2, the generator 3 and the intake pipe 42 are intensively arranged in the up-down direction and in the vehicle width direction, in an efficient manner. Therefore, the vehicle power generating apparatus according to the above embodiment has an advantage of being able to contribute to not only a reduction in the up-down directional occupied space thereof but also a reduction in a vehicle width directional occupied space thereof.

In the vehicle power generating apparatus according to the above embodiment, the exhaust gas purifying device 47a of the exhaust pipe 46 is disposed at a position forward of the engine 2 and beneath the intake pipe 42, so that it becomes possible to efficiently lay out the exhaust gas purifying device 47a by utilizing a space beneath the intake pipe 42. In addition, as a result of disposing the exhaust gas purifying device 47a at the position forward of a relatively lower side of the engine 2, it becomes possible to promote cooling of the exhaust gas purifying device 47a (exhaust pipe) by wind during vehicle traveling. This also provides an advantage of being able to enhance heat releasability of the engine 2.

In the vehicle power generating apparatus according to the above embodiment, the exhaust pip 46 is configured to guide exhaust gas discharged from the engine 2 and purified by the exhaust gas purifying device 47a, into the muffler 47b via a position beneath the generator 3. That is, the exhaust pip 46 is configured to guide the exhaust gas in a vehicle rear direction without being routed via a position forward of the fuel tank 5. This provides an advantage of being able to reduce radiant heat from the exhaust pipe 46 to the fuel tank 5 during vehicle traveling, and effectively prevent a situation where the fuel tank 5 is thermally damaged due to the radiant heat.

In the vehicle power generating apparatus according to the above embodiment, the rotary engine is employed as the engine 2, and the engine 2 is installed in the vehicle in the horizontally mounted state, and in laterally side-by-side relation to the generator 3, as described above. This structure provides the following advantage.

For example, in the case where an engine (rotary engine) is installed in the vertically mounted state (in a posture where an eccentric shaft extends horizontally), discussing in terms of supporting rigidity for the engine, a load direction (up-down direction) having a great impact on ride comfort, and a rotation direction of the engine having a great impact on NVH (Noise/Vibration/Harshness) become coincident with each other. Thus, in designing of engine mounts (spring constants), it is difficult to consider the above two factors as an up-down directional property and a horizontal directional property separately. In reality, design satisfying both of the properties is hardly achieved. Thus, there is no choice but to place priority to either one of the properties, so that it becomes difficult to satisfy both of ride comfort and NVH. Differently, in the case where the engine 2 is installed in the horizontally mounted state (as in the above embodiment), the rotation direction of the engine 4 is about a vertical axis, i.e., is perpendicular to the load direction of the engine (up-down direction). That is, in designing of engine mounts (the mounts 30), it is possible to consider the above two factors as an up-down directional property and a horizontal directional property separately. Thus, there is an advantage of becoming possible to satisfy both of ride comfort and NVH.

In the vehicle power generating apparatus according to the above embodiment, by utilizing such an advantage, positions of the flanges 4a of the power generation unit 1 (frame member 4) are preliminarily set to allow flanges 4a to equally support a load. This structure makes it possible to employ, as the mounts 30, mounts each having the same structure. This is advantageous in terms of assemblability and production cost of the mounts 30.

In the aforementioned structure where the engine 2 and the generator 3 are arranged in laterally side-by-side relation (in which the eccentric shaft is arranged in parallel to an input shaft of the generator 3), an inertia moment about a rotational axis of the engine is significantly increased, as compared to the case where the engine and the generator are serially arranged, i.e., the engine and the generator are arranged in an axial direction of the eccentric shaft (series arrangement in which the eccentric shaft is arranged in series with the input shaft of the generator). This provides an advantage of being able to, even if an eigenvalue in other rotation direction or translation direction is designed to have a larger value for the purpose of ride comfort or the like, maintain an eigenvalue about the rotation axis of the engine at a relatively low value so as to satisfy both of NVH, and ride comfort requiring relatively high rigidity.

It is to be understood that the aforementioned vehicle power generating apparatus has been exemplified as a preferred embodiment of the present invention, and a specific structure thereof may be appropriately changed and modified without departing from the spirit and scope of the present invention as set forth in appended claims. For example, in the above embodiment, the exhaust port 72 of the engine 2 is formed to curve inside the lower side housing 62b (see FIG. 10) in such a manner as to be communicated with the exhaust pipe 46 connected to the side surface of the lower side housing 62b. Alternatively, in a situation where there is an allowance in terms of space, beneath a vehicle, the engine 2 may be configured such that the exhaust port 72 is opened in a lower surface of the lower side housing 62b, and the exhaust pipe 46 is connected to the lower surface of the lower side housing 62b.

<Outline of Present Invention>

The present invention will be outlined as follows.

The present invention provides a vehicle power generating apparatus disposed in a position beneath a floor panel of a vehicle. The vehicle power generating apparatus comprises: a generator; a rotary engine configured to serve as an engine for driving the generator, and installed in the vehicle in a posture where an output shaft thereof extends in an up-down direction; and an intake pipe and an exhaust pipe each connected to the rotary engine, wherein the rotary engine comprises a pair of upper and lower side housings, and a rotor housing located between the upper and lower side housings, wherein the rotor housing and the lower side housing are formed with an intake port and an exhaust port, respectively, and wherein the intake pipe is connected to a side surface of the rotor housing in such a manner as to be communicated with the intake port, and the exhaust pipe is connected to the lower side housing in such a manner as to be communicated with the exhaust port.

In the vehicle power generating apparatus of the present invention, the intake pipe is connected to a side surface of the rotary engine (the side surface of the rotor housing), so that it becomes possible to prevent a situation where the intake pipe largely protrudes from the rotary engine in the up-down direction, and intensively dispose the rotary engine and the intake pipe in the up-down direction. This makes it possible to reduce an up-down directional occupied space of the vehicle power generating apparatus. In addition, the exhaust port is formed in the lower side housing. This is advantageous in view of suppressing exhaust noise. That is, the rotor housing and the upper side housing are interposed between the lower side housing formed with the exhaust port and the rear floor panel, so that exhaust noise occurring in the exhaust port is blocked by the rotor housing and the upper side housing to ease an influence of the exhaust noise on a passenger compartment. Therefore, the vehicle power generating apparatus can reduce the up-down directional occupied space thereof, while suppressing exhaust noise of the engine. Further, the exhaust pipe is connected to the lower side housing as mentioned above, so that it becomes possible to effectively cool the exhaust pipe (exhaust gas) by utilizing wind during vehicle traveling to thereby enhance heat releasability of the rotary engine.

Preferably, in the vehicle power generating apparatus of the present invention, the exhaust pipe is connected to a side surface of the lower side housing, and the exhaust port is formed to curve inside the lower side housing in such a manner as to be communicated with the exhaust pipe.

According to this feature, it becomes possible to prevent a situation where the exhaust pipe largely protrudes from the rotary engine in the up-down direction, and intensively dispose the rotary engine and the exhaust pipe in the up-down direction. This makes it possible to intensively dispose the rotary engine, the intake pipe and the exhaust pipe in the up-down direction to thereby further reduce the up-down directional occupied space of the vehicle power generating apparatus.

Preferably, in the vehicle power generating apparatus of the present invention, the generator and the rotary engine are arranged in adjacent relation to each other in a vehicle width direction, the intake port is formed on a vehicle front side of the rotor housing of the rotary engine, and the intake pipe is connected to the vehicle front side of the side surface of the rotor housing, and disposed to extend in the vehicle width direction, across a position on the vehicle front side of the generator.

According to this feature, the rotary engine, the generator and the intake pipe can be intensively arranged in the up-down direction and in the vehicle width direction, in an efficient manner. Therefore, it becomes possible to contribute to not only a reduction in the up-down directional occupied space of the vehicle power generating apparatus but also a reduction in a vehicle width directional occupied space of the vehicle power generating apparatus.

In the above vehicle power generating apparatus, the exhaust pipe comprises an exhaust gas purifying device disposed at a position on the vehicle front side of the rotary engine and beneath the intake pipe.

According to this feature, it becomes possible to efficiently lay out the exhaust gas purifying device by utilizing a space beneath the intake pipe. In addition, the exhaust gas purifying device can be disposed at a lower position with respect to the vehicle, so that it becomes possible to adequately cool the exhaust gas purifying device by wind during vehicle traveling.

Preferably, the above vehicle power generating apparatus further comprises a fuel tank configured to contain fuel for driving the rotary engine, and disposed at a position adjacent to the generator and on a side opposite to the rotary engine in the vehicle width direction, wherein the exhaust pipe is configured to guide exhaust gas discharged from the engine and purified by the exhaust gas purifying device, in a vehicle rear direction via a position beneath the generator.

According to this feature, it becomes possible to guide the exhaust gas in a vehicle rear direction without being routed via a position forward of the fuel tank. This makes it possible to reduce radiant heat from the exhaust pipe to the fuel tank during vehicle traveling, and effectively prevent a situation where the fuel tank is thermally damaged due to the radiant heat.

This application is based on Japanese Patent application No. 2014-041515 filed in Japan Patent Office on Mar. 4, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle power generating apparatus disposed in a position beneath a floor panel of a vehicle, comprising:
    a generator;
    a rotary engine configured to serve as an engine for driving the generator, and installed in the vehicle; and
    an intake pipe and an exhaust pipe each connected to the rotary engine, wherein
    the rotary engine comprises a pair of upper and lower side housings, and a rotor housing located between the upper and lower side housings, the rotor housing and the lower side housing being formed with an intake port and an exhaust port, respectively,
    the intake pipe is connected to a side surface of the rotor housing in such a manner as to be communicated with the intake port, and
    the exhaust pipe is connected to the lower side housing in such a manner as to be communicated with the exhaust port.

2. The vehicle power generating apparatus as defined in claim 1, wherein
    the exhaust pipe is connected to a side surface of the lower side housing, and
    the exhaust port is formed to curve inside the lower side housing in such a manner as to be communicated with the exhaust pipe.

3. The vehicle power generating apparatus as defined in claim 2, wherein
    the generator and the rotary engine are arranged in adjacent relation to each other in a vehicle width direction,
    the intake port is formed on a vehicle front side of the rotor housing of the rotary engine, and
    the intake pipe is connected to the vehicle front side of the side surface of the rotor housing, and disposed to extend in the vehicle width direction, across a position on the vehicle front side of the generator.

4. The vehicle power generating apparatus as defined in claim 3, wherein
    the exhaust pipe comprises an exhaust gas purifying device disposed at a position on the vehicle front side of the rotary engine and beneath the intake pipe.

5. The vehicle power generating apparatus as defined in claim 4, further comprising
    a fuel tank configured to contain fuel for driving the rotary engine, and disposed at a position adjacent to the generator and on a side opposite to the rotary engine in the vehicle width direction, wherein
    the exhaust pipe is configured to guide exhaust gas discharged from the engine and purified by the exhaust gas purifying device, in a vehicle rear direction via a position beneath the generator.

6. The vehicle power generating apparatus as defined in claim 1, wherein
    the generator and the rotary engine are arranged in adjacent relation to each other in a vehicle width direction,
    the intake port is formed on a vehicle front side of the rotor housing of the rotary engine, and
    the intake pipe is connected to the vehicle front side of the side surface of the rotor housing, and disposed to extend in the vehicle width direction, across a position on the vehicle front side of the generator.

7. The vehicle power generating apparatus as defined in claim 6, wherein
    the exhaust pipe comprises an exhaust gas purifying device disposed at a position on the vehicle front side of the rotary engine and beneath the intake pipe.

8. The vehicle power generating apparatus as defined in claim 6, further comprising
    a fuel tank configured to contain fuel for driving the rotary engine, and disposed at a position adjacent to the generator and on a side opposite to the rotary engine in the vehicle width direction, wherein
    the exhaust pipe is configured to guide exhaust gas discharged from the engine and purified by the exhaust gas purifying device, in a vehicle rear direction via a position beneath the generator.

* * * * *